(12) United States Patent
Smith (10) Patent No.: US 12,429,212 B2
(45) Date of Patent: Sep. 30, 2025

(54) TOOL LIGHT

(71) Applicant: Thomas Daniel Smith, Meridian, ID (US)

(72) Inventor: Thomas Daniel Smith, Meridian, ID (US)

( * ) Notice: Subject to any disclaimer, the term of this patent is extended or adjusted under 35 U.S.C. 154(b) by 608 days.

(21) Appl. No.: 16/254,585

(22) Filed: Jan. 22, 2019

(65) Prior Publication Data

US 2019/0226674 A1 Jul. 25, 2019

Related U.S. Application Data

(60) Provisional application No. 62/622,895, filed on Jan. 27, 2018, provisional application No. 62/619,318, filed on Jan. 19, 2018.

(51) Int. Cl.
*F21V 3/00* (2015.01)
*B25F 5/02* (2006.01)
*B60S 3/04* (2006.01)
*F21V 33/00* (2006.01)

(52) U.S. Cl.
CPC ............ *F21V 33/0084* (2013.01); *B25F 5/02* (2013.01); *B25F 5/021* (2013.01); *B25F 5/026* (2013.01); *B60S 3/044* (2013.01)

(58) Field of Classification Search
CPC ........ F21V 33/0084; B25F 5/02; B25F 5/021; B25F 5/026; B60S 3/044
USPC ............................... 362/119, 109, 191, 190
See application file for complete search history.

(56) References Cited

U.S. PATENT DOCUMENTS

| | | | | |
|---|---|---|---|---|
| 6,116,747 | A * | 9/2000 | Grawemeyer | ...... B25B 23/0021 362/109 |
| 8,360,597 | B1 * | 1/2013 | Hanchett | ................. B25F 5/021 362/119 |
| 11,801,593 | B2 * | 10/2023 | Valentini | ................. B25F 5/021 |
| 2007/0014101 | A1 * | 1/2007 | Huang | ................. F21V 21/088 362/119 |
| 2015/0239119 | A1 * | 8/2015 | Hurst | ...................... B25F 5/026 248/674 |

* cited by examiner

*Primary Examiner* — Abdulmajeed Aziz
*Assistant Examiner* — Jessica M Apenteng
(74) *Attorney, Agent, or Firm* — Parry IP PLLC; Jeffrey C. Parry (57) ABSTRACT

A powered tool may be improved by mounting a light thereto. Some examples of a powered tool include a polisher tool adapted to polish and/or buff a work surface. Other examples of a power tool include various rotary, orbital, reciprocating, or other types of handheld tools. In various examples, a bracket can secure a light to a polisher or buffer tool so that the work surface can be directly illuminated to improve the efficiency and comfort of the tool operator. The bracket can be repositioned on the hand tool to optimize light direction to enhance the effectiveness of the hand tool.

16 Claims, 6 Drawing Sheets

TOOL LIGHT

CROSS-REFERENCE TO RELATED APPLICATIONS

The present application claims the filing date benefit of U.S. Provisional Patent Application No. 62/619,318, filed Jan. 19, 2018 and titled "TOOL LIGHT" and of U.S. Provisional Patent Application No. 62/622,895, filed Jan. 27, 2018 and titled "TOOL LIGHT," the contents of both applications being hereby fully incorporated by reference.

BACKGROUND

Technical Field

The present disclosure relates generally to automobile detailing. More particularly, the disclosure relates to an illumination apparatus for power tools.

Description of Related Art

Currently, there exists various tools adapted to polish surfaces. In the particular industry of automobile detailing, powered polisher hand tools comprise orbital and/or rotary tools that have a polishing or buffing surface. The orbiting or rotating motion of the polishing or buffing surface can polish and/or buff various work surfaces, said tools commonly being used to polish and/or buff exterior surfaces of automobiles.

As an operator uses a buffer and/or polisher tool on a work surface, visual cues on the work surface may typically influence where and how the operator will direct the tool. For example, the operator may carefully look for surface flaws and pass the polishing or buffing surface of the tool, while activating said tool, over said flaws in order to correct and/or remove the flaws. This process may be repeated on various sections of the work surface until the operator is satisfied that no more flaws are visible on the work surface.

In many cases, lighting conditions are not ideal for highlighting flaws in the work surface. As an example, many detail shops use artificial overhead lighting that fail to expose the flaws in a work surface being polished, thereby leading the operator to not adequately polish or buff the work surface. As a result, the work surface may continue to exhibit flaws even after the operator has completed buffing or polishing. Missing such flaws may cause additional time and/or expense in order to correct those flaws.

SUMMARY

In one embodiment, a bracket for mounting a light source to a power tool is disclosed. The bracket includes a bracket arm, a light-mounting hole, and an anchor hole. The light-mounting hole has an internal facing tooth.

In another embodiment, a method of polishing an automobile is disclosed. The method includes providing a power tool with a bracket attached, directing a light source at a work surface of the automobile, and engaging a polishing surface of the power tool with the work surface. The bracket has a bracket arm, a light-mounting hole, an anchor hole, and the light source seated in the light-mounting hole. The light-mounting hole includes an internal facing tooth.

In another embodiment, a bracket for mounting a light source to a power automotive polisher tool is disclosed. The bracket includes a bracket arm, a light-mounting hole, an anchor hole, a fastener, a grip ring, and a light source. The light-mounting hole is at a first end of the bracket arm and has an internal facing tooth. The anchor hole is at a second end of the bracket arm. The second end is opposite of the first end. The fastener secures the bracket to the power automotive polisher tool. The grip ring is seated within the light-mounting hole and comprises a deformable material. The light source is seated in the grip ring and in the light-mounting hole.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the disclosure to those skilled in the art. Non-limiting and non-exhaustive embodiments of the present disclosure are described with reference to the following figures, wherein like reference numerals refer to like parts throughout the various views unless otherwise specified.

BRIEF DESCRIPTION OF THE DRAWINGS

Non-limiting and non-exhaustive embodiments of the present disclosure are described with reference to the following figures.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

Embodiments of the present disclosure serve to temporarily and reliably secure a powered light to an existing polisher or buffer for automotive paint polishing by the use of a mount. The present disclosure relates to a mount for a power tool to secure a light to a mounting hole on the tool and/or the head of said tool. In some embodiments, the tool comprises a powered car polishing or buffing tool. In other embodiments, the tool comprises one of any number of power tools, including various rotary, orbital, reciprocating, or other types of handheld tools. In embodiments, said tool may be either battery-powered (i.e. cordless) or corded. Said light, by being mounted by a bracket or other mounting, may be enabled to cast a beam of light onto a viewing area of the work surface, thereby visibly exposing any flaws in the surface being polished and/or worked and improving the quality of the task. The light may be mounted to a bracket or to the tool mechanically, magnetically, via hook-and-loop (which may be commonly known by the trademark Velcro), or by other types of fasteners, connectors, brackets, hardware, or the like.

Figure 1:
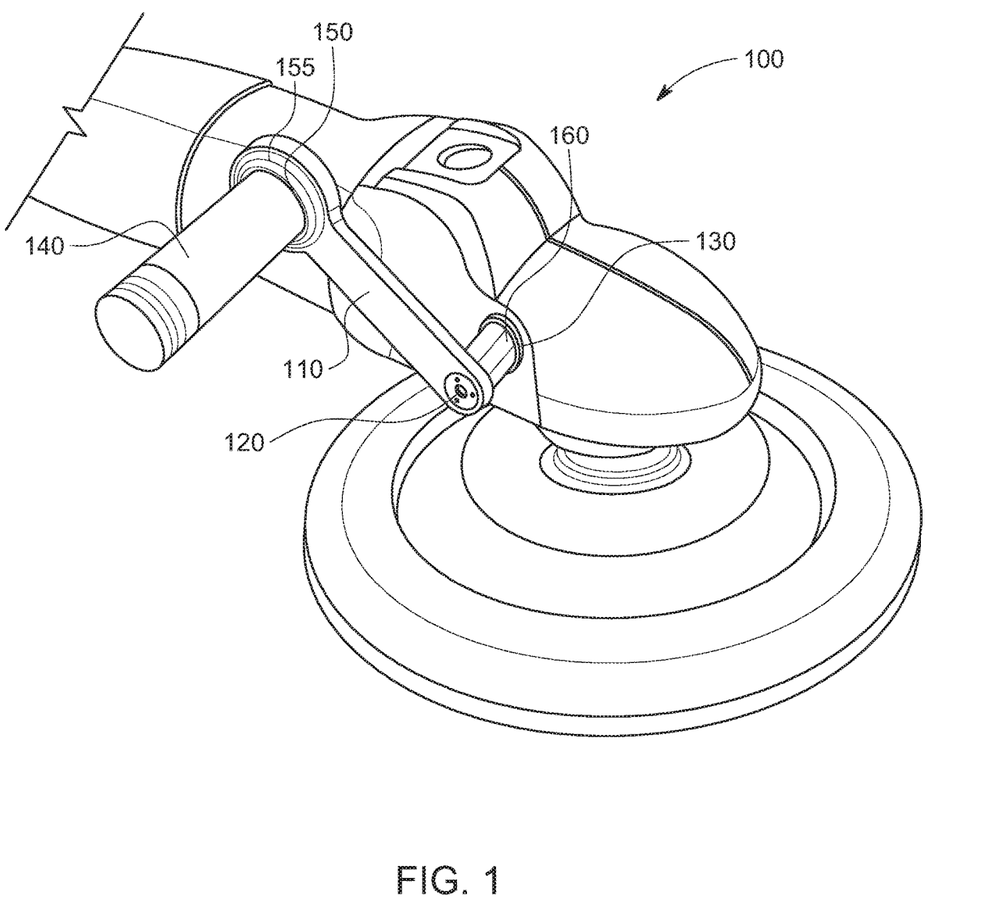
FIG. 1 depicts a front perspective view of a flashlight mounted to a polisher according to an embodiment of the present disclosure.

Referring now to FIG. 1, in one embodiment of the present disclosure, a polisher 100 has bracket 110 affixed thereto via a mechanical fastener comprising a bolt 120 secured into grip anchor hole 130 in the housing of polisher 100. In this embodiment, a portable light 140 is inserted into light hole 150 of bracket 110 via a snug, friction-enabled fit. In embodiments, bracket 110 comprises a non-slip ring 155 within hole 150 in such a manner that the ring grips the light 140 and maintains the position of light 140 within hole 150. In one embodiment, an arm or bracket is attached to one or both sides of the polisher utilizing a hardware fastener, a magnetic, or another type of attachment for a light source to be mounted to the polisher for improved vision of the close-up working area on the work surface being polished.

As would be understood by a person of ordinary skill in the art having the benefit of this disclosure, bracket 110 may be secured to polisher 100 at any angle, as determined by the rotational relationship between bolt 120 and hole 130. This angle may be determined by personal preference, current lighting conditions, and/or characteristics of the work surface. In the embodiment depicted, bracket 110 is secured at a position of approximately ten to eleven o'clock, as determined by facing the side of polisher 100 where bracket 110 is mounted. In other embodiments, bracket 110 is secured at a position of approximately one to two o'clock. In other embodiments, bracket 110 is secured at a position of approximately two to three o'clock. In other embodiments, bracket 110 is secured at a position of approximately nine to ten o'clock. In other embodiments, bracket 110 is secured at a position of approximately eleven to one o'clock. As used throughout the present disclosure, the term "approximately" may be interpreted to mean within 15 degrees of the stated value when dealing with angles and/or rotational relationships.

Under some circumstances, it may be desirable to use two flashlights on a polisher 100. In some embodiments, two brackets 110 are mounted to polisher 100, one on each side, to provide two flashlight mounting locations. In such embodiments, each bracket 110 may be positioned at an angle that is independent from the other bracket 100 according to circumstances and personal preferences of the operator.

In embodiments, a spacer 160 on bolt 120 enables bracket 110 to be positioned a predetermined distance away from the housing of polisher 100. In various embodiments, spacer 160 has a length of approximately one inch. In other embodiments, spacer 160 has a length between one-half and one inch. In other embodiments, spacer 160 has a length between one inch and one and one-half inch. In other embodiments, spacer 160 has a length between one and one-half inch and two inches. In other embodiments, spacer 160 has one of any number of lengths as may be suitable for the polisher 100 housing and other conditions and circumstances. In some embodiments, no spacer is utilized. As used throughout the present disclosure, the term "approximately" may be interpreted to mean within one-fourth inch of the stated value when dealing with length.

In embodiments, washers may be inserted onto a bolt or other hardware. In one embodiment, a spring or locking washer is placed on the hardware on one or both sides of the spacer 160. In various embodiments, said washers may be utilized to minimize or mitigate loosening of the bolt or other mounting hardware that could otherwise occur as a result of vibrations from operation of the power tool.

According to some embodiments, a magnetic or mechanical grommet mount provides a means to reliably and temporarily attach a light to a power polishing tool in a position or state that improves the close-up lighting for users of the tool. In embodiments, the bracket is attached to the head of an automotive rotary polisher by a fastener. In various embodiments, said fastener is one of a variety of fastener types, including but not limited to: a metal fastener, a plastic fastener, an adhesive fastener, a magnetic fastener, or a hook-and-loop type fastener.

In some embodiments of the present disclosure, a bracket attaches to a power tool via a quick-release mechanism adapted to provide a tool-less secure attachment of a light source to a power tool.

Various embodiments of the present disclosure include a substantially U-shaped bracket including a spaced apart pair of mounting arms each having a base end and an opposite distal end, a rigid cross member joining the pair of mounting arms at the base ends, a mounting head on each distal end of the pair of mounting arms, at least one magnet or hook-and-loop type fastener mounted on the cross member or head of the polisher, wherein the mounting arm is disposed in a direction from the cross member and the at least one magnet or hook-and-loop type fastener is disposed in a second direction substantially opposite to the first direction, from the cross member, and wherein the mounting heads are adapted for mounting to at least one side of the power polishing tool. In such embodiments, the magnet has at least one substantially planar face. A magnet holder may be mounted onto the cross member. The magnet may be mounted onto the magnet holder to maintain the planar face of the magnet in an orthogonal plane substantially orthogonal to a first plane substantially containing at least the cross member and the pair of mounting arms. The U-shaped bracket may be sized to fit over and receive the power polishing tool between the pair of mounting arms in a mounting fashion. In one embodiment, the U-shaped bracket has two arms wherein each arm is a bracket substantially the same as the bracket 110 described above, wherein both brackets are connected at a distal end by a cross member. In some embodiments, such a cross member comprises a light-mounting surface where a light may be affixed. In one embodiment, said cross member comprises a light-mounting hole into which a portable light source may be inserted and held in place.

Figure 2:
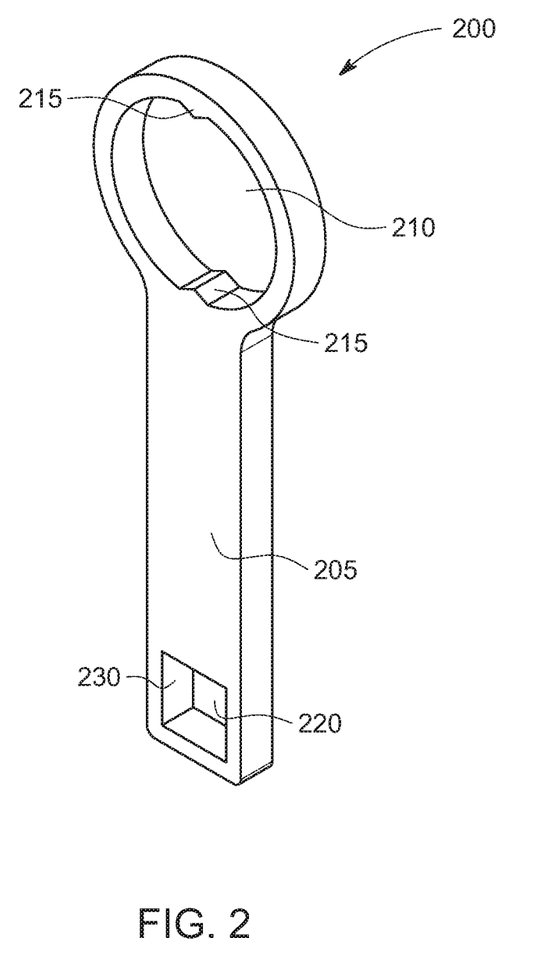
FIG. 2 depicts a mounting bracket having a square mounting hole according to one embodiment of the present disclosure.

Referring to FIG. 2, one embodiment of the present disclosure comprises bracket 200. As shown, bracket 200 comprises an arm portion 205, a light-mounting hole 210, and a mounting hole 220. Embodiments of brackets comprise one or more inward-facing gripping teeth 215 inside mounting hole 210, adapted to secure a flashlight therewithin. The diameter of mounting hole 210 may be designed to securely receive a tube-style flashlight, such that vibrations due to operation of the polisher do not dislodge the flashlight from mounting hole 210.

According to embodiments, teeth 215 comprise one or more inward-facing protrusions within hole 210. In one embodiment, teeth 215 are integral to the body of bracket 210. In another embodiment, teeth 215 comprise individual elements that are affixed to surfaces within hole 210. In various embodiments, the dimensions of teeth 215 are designed to provide a secure and snug grip to a flashlight inserted within hole 210, in such a manner that teeth 215 can hold said flashlight at a given position and resist movement thereof that could otherwise occur as a result of vibrations caused by operation of the power tool to which bracket 200 is attached. The width, angle, and length of teeth 215 may depend on additional factors such as the diameter of hole 210, the diameter the flashlight to be inserted into hole 210, and the thickness and material makeup of the grip ring inserted into hole 210 disposed between inward-facing surface of hole 210 and the flashlight.

Figure 3:
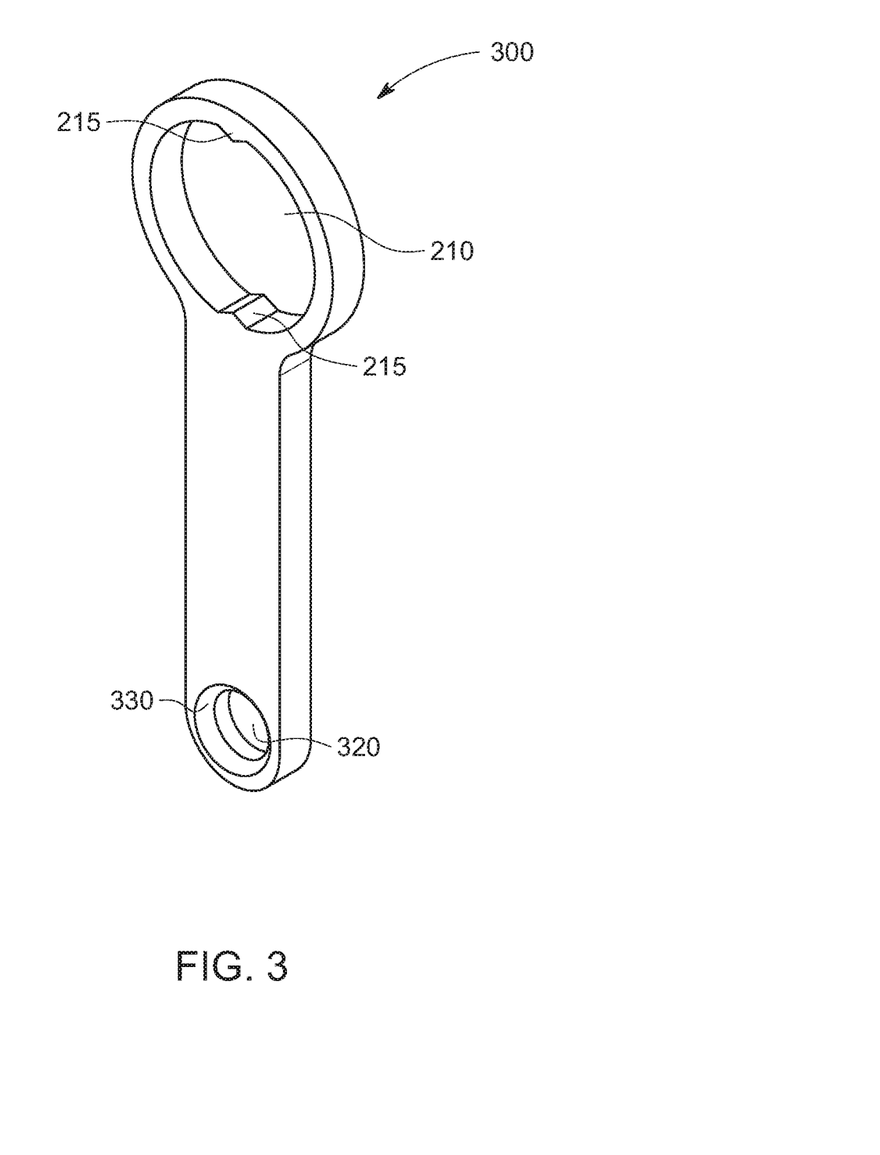
FIG. 3 depicts a mounting bracket having a round mounting hole according to one embodiment of the present disclosure.

In embodiments, hole 220 is adapted to be secured to a hand tool, such as a powered polisher or buffer, by passing a bolt or other fastener hardware therethrough. One embodiment comprises a square mounting hole 220. Referring to FIG. 3, one embodiment comprises a bracket 300 having a round mounting hole 320. In other embodiments, the mounting hole may be made in a variety of shapes and/or sizes that allow a bracket to be mounted to a power tool.

In some embodiments of the present disclosure, mounting hole 220 comprises an internal tapered surface 230 or shoulder against which mounting hardware, for example the head of a bolt, can abut to securely connect bracket 200 and polisher 100. In one embodiment, mounting hole 320 comprises an internal conical surface 330 or shoulder against which mounting hardware can abut to securely connect bracket 300 and polisher 100.

Figure 4:
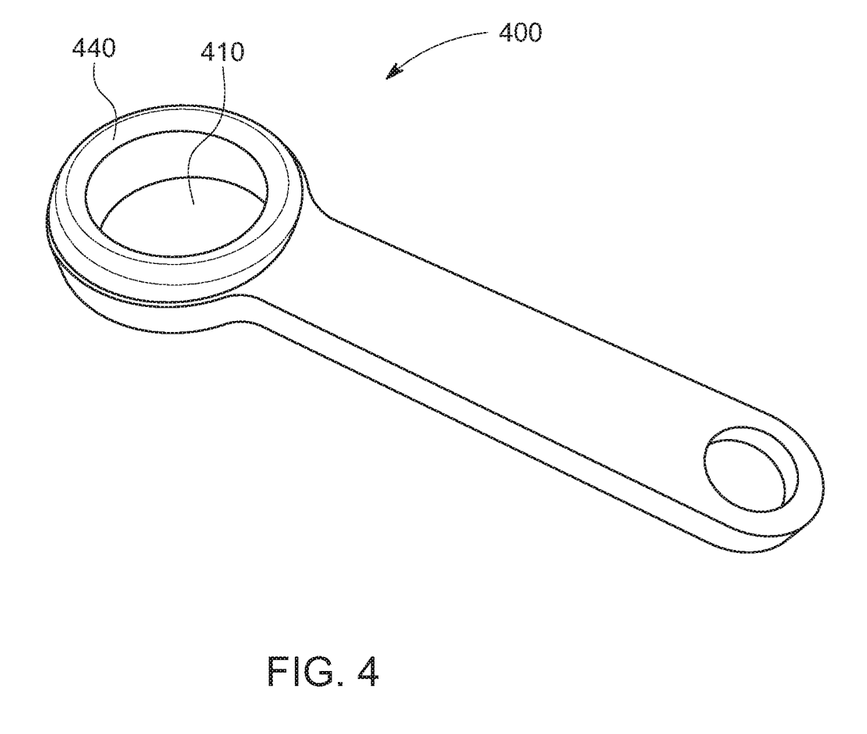
FIG. 4 depicts a mounting bracket having a rubber light mount ring according to one embodiment of the present disclosure.

Referring to FIG. 4, embodiments of the present disclosure comprise a non-slip ring 440 inserted into the light-mounting hole 410 of a bracket 400. In one embodiment, said ring 440 comprises a rubber ring. In other embodiments, ring 440 is manufactured from other materials adapted to hold a flashlight in place within light-mounting hole 410. Embodiments of ring 440 are sized to fit within light-mounting hole 410 and have an annular exterior groove sized to snugly receive the interior inward-facing annular surface of light-mounting hole 410. Embodiments of ring 440 have an inner diameter sized to snugly receive a flashlight. As would be apparent to a person of ordinary skill in the art having the benefit of this disclosure, it may be beneficial for ring 440 to provide a dampening function on the inserted flashlight due to vibrations that may be caused by a polisher or other power tool on which bracket 400 is affixed. It may be desirable for ring 440 to provide a snug friction fit that can resist rotational movement of a flashlight within the ring 440 so that the flashlight will remain pointed at the desired location during operation of a polisher or other power tool.

Figure 5:
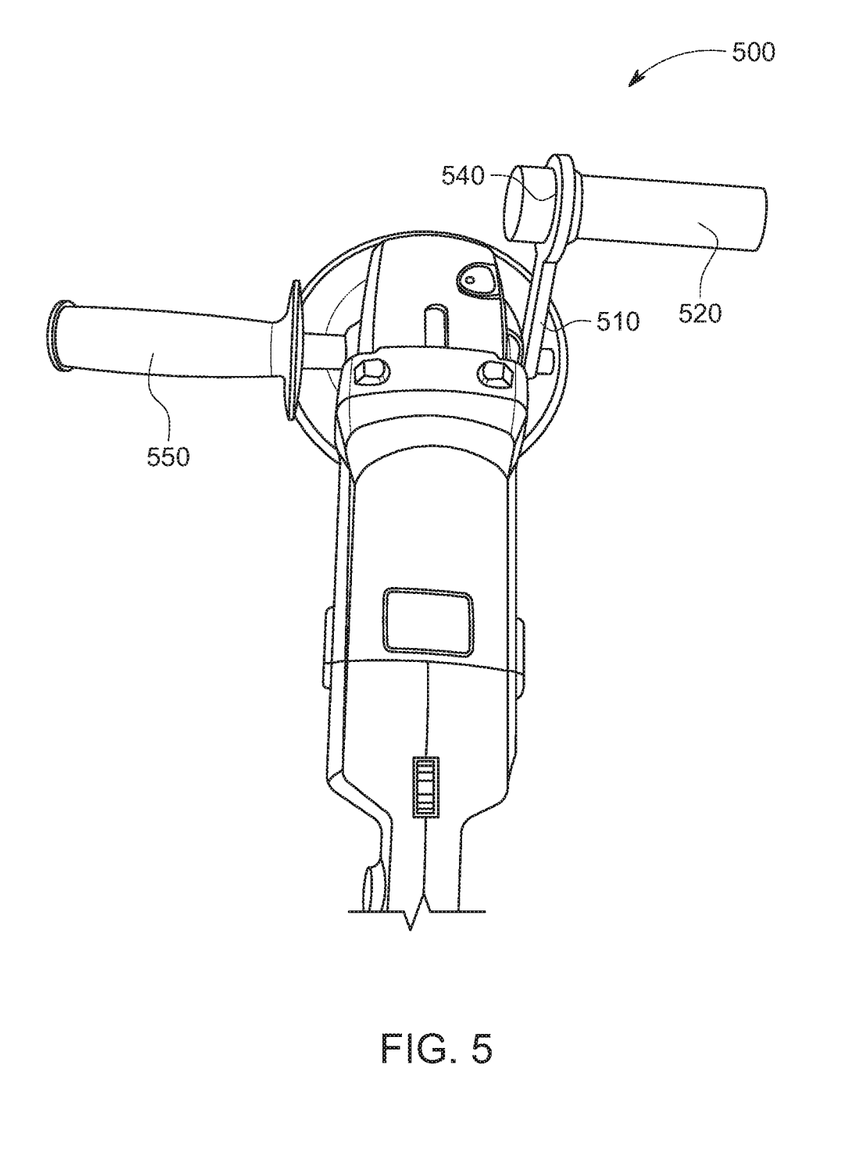
FIG. 5 depicts a top view of a flashlight mounted to a polisher according to an embodiment of the present disclosure.

Referring to FIG. 5, a power tool 500 has a bracket 510 mounted thereto with a flashlight 520 held thereby. The flashlight 520 may be aimed at the work surface by an operator of the tool 500 as the operator desires by rotating the flashlight 520 within the bracket flashlight mounting hole 540 and/or by rotating the bracket 510 relative to the power tool 500 and/or by moving the bracket 510 mounting location on the power tool 500. For example, power tool 500 comprises handle grip 550. In various makes of similar polisher power tools, a similar handle grip is attached to a mounting hole via a bolt or similar hardware. In embodiments of the present disclosure, bracket 510 can be mounted to said handle grip mounting hole(s) on either side of a power tool.

Figure 6:
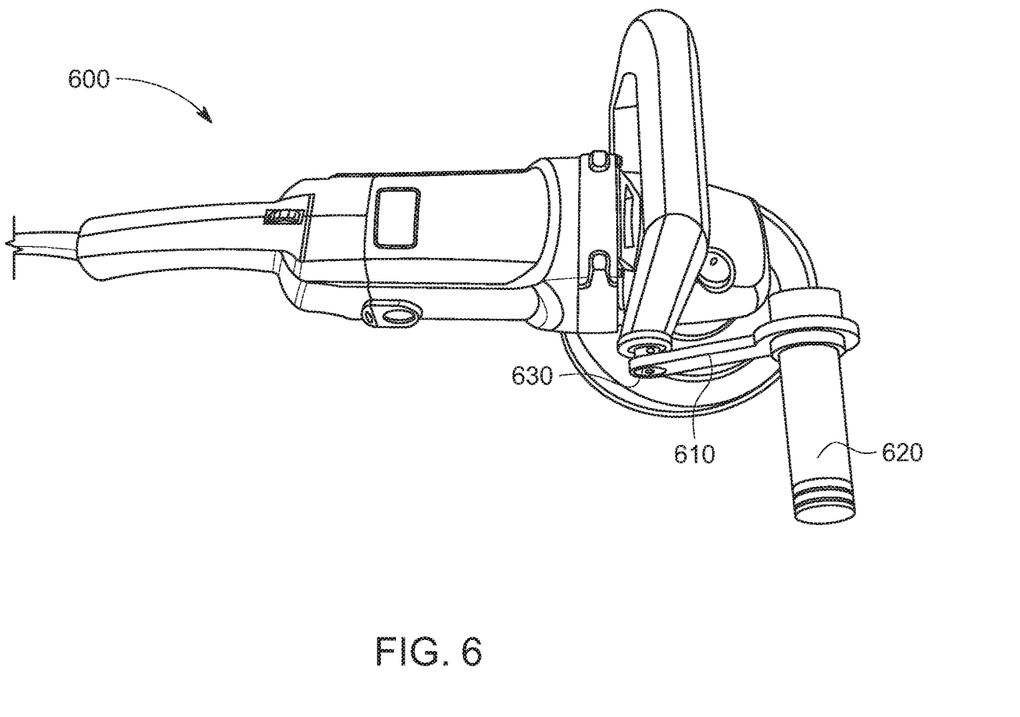
FIG. 6 depicts a side perspective view of a flashlight mounted to a polisher according to an embodiment of the present disclosure.

Referring to FIG. 6, embodiments of the present disclosure comprise a flashlight 620 mounted above and to the side of the polishing surface of polisher tool 600. If desired, the position of the flashlight 620 can be adjusted by loosening bolt 630, rotating bracket 610 to a desired position, and tightening bolt 630.

In embodiments of the present disclosure, the mounting bracket is manufactured from a variety of materials. In some examples, the bracket is manufactured of aluminum, steel, fiberglass, carbon fiber, various alloys, and/or combinations of any of the foregoing materials. In various embodiments, other rigid, strong, and/or lightweight materials are used for the bracket. In some embodiments, the bracket is fabricated by cutting from a flat plate of material. In other embodiments, the bracket is fabricated by other methods including but not limited to casting or three-dimensional printing.

In embodiments, the grip ring is manufactured from various types of rubber materials, similar synthetic compositions, or blends thereof. In embodiments, other elastic and/or compliant and/or deformable materials are used for the grip ring.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A bracket for mounting a light source to a power tool comprising:
   a bracket arm;
   a light-mounting hole comprising an internal facing tooth; and
   an anchor hole;
   the bracket being mounted to an automotive polisher by a fastener selected from the group consisting of a metal fastener, a plastic fastener, an adhesive fastener, a magnetic fastener, a hook-and-loop type fastener, and a quick-release type fastener.

2. The bracket of claim 1, wherein the power tool comprises an automotive polisher.

3. The bracket of claim 1, further comprising a mounting bolt attached to the automotive polisher.

4. The bracket of claim 1, further comprising a second bracket arm, wherein the bracket arm and the second bracket arm are mounted to different respective sides of the automotive polisher.

5. The bracket of claim 4, further comprising a cross member extending between the bracket arm and the second bracket arm, wherein a light source is mounted to the cross member.

6. The bracket of claim 1, wherein a light source is seated in the light-mounting hole of the bracket.

7. The bracket of claim 1, further comprising a grip ring annularly seated in the light-mounting hole, wherein the grip ring comprises a deformable material.

8. A method of polishing an automobile, comprising:
providing an automotive polisher power tool with a bracket mounted thereto by a fastener selected from the group consisting of a metal fastener, a plastic fastener, an adhesive fastener, a magnetic fastener, a hook-and-loop type fastener, and a quick-release type fastener, the bracket comprising:
a bracket arm;
a light-mounting hole comprising an internal facing tooth;
an anchor hole; and
a light source seated in the light-mounting hole;
directing the light source at a work surface of the automobile; and
engaging a polishing surface of the power tool with the work surface.

9. The method of claim 8, wherein a mounting bolt attaches the bracket to the automotive polisher.

10. The method of claim 8, wherein a light source is seated in the light-mounting hole of the bracket.

11. The method of claim 8, wherein:
the bracket further comprises a compliant grip ring annularly seated in the light-mounting hole, wherein the grip ring comprises a deformable material and
a light source is seated within the grip ring.

12. The method of claim 8, wherein directing the light source at the work surface further comprises:
rotating the light source within the light-mounting hole to aim a beam of light emanating from the light source at a portion of the work surface.

13. The method of claim 8, further comprising radially adjusting the bracket relative to the power tool, thereby altering the light source from a first position relative to the power tool to a second position relative to the power tool.

14. The method of claim 13, wherein the first position is defined by a horizontal offset from the power tool.

15. The method of claim 13, wherein the first position is defined by a vertical offset from a polishing surface of the power tool.

16. A power automotive polisher tool comprising:
a bracket arm mounted to a first side of the power automotive polisher tool;
a light-mounting hole at a first end of the bracket arm, the light-mounting hole comprising an internal facing tooth;
an anchor hole at a second end of the bracket arm, the second end being opposite of the first end;
a fastener, said fastener securing the bracket to said power automotive polisher tool;
a grip ring seated within the light-mounting hole, wherein the grip ring comprises a deformable material;
a light source seated in the grip ring and in the light-mounting hole; and
a second bracket arm mounted to a second side of the automotive polisher tool.

\* \* \* \* \*